(12) United States Patent
Stuart

(10) Patent No.: US 6,802,332 B1
(45) Date of Patent: Oct. 12, 2004

(54) SHEAR VALVE

(75) Inventor: Graham M. Stuart, Surrey (GB)

(73) Assignee: Risbridger Limited (GB)

( * ) Notice: Subject to any disclaimer, the term of this patent is extended or adjusted under 35 U.S.C. 154(b) by 220 days.

(21) Appl. No.: 10/111,150

(22) PCT Filed: Oct. 20, 2000

(86) PCT No.: PCT/GB00/04062
§ 371 (c)(1),
(2), (4) Date: Apr. 19, 2002

(87) PCT Pub. No.: WO01/31249
PCT Pub. Date: May 3, 2001

(30) Foreign Application Priority Data

Oct. 22, 1999 (GB) .............................................. 9925106

(51) Int. Cl.[7] .......................... F16K 17/38; F16K 17/40; B67D 5/32
(52) U.S. Cl. ................................. 137/68.12; 137/68.14; 137/71; 137/493.3
(58) Field of Search .......................... 137/68.11, 68.12, 137/68.14, 71, 73, 79, 493.3, 493.9

(56) References Cited

U.S. PATENT DOCUMENTS

| | | | | | |
|---|---|---|---|---|---|
| 2,898,926 A | * | 8/1959 | Tsiguloff | ................... | 137/68.14 |
| 2,962,035 A | * | 11/1960 | Wright et al. | ............ | 137/68.14 |
| 4,398,553 A | * | 8/1983 | Perrine | .................... | 137/68.14 |
| 4,898,199 A | * | 2/1990 | Morris et al. | ............. | 137/68.14 |
| 5,099,870 A | * | 3/1992 | Moore et al. | .................. | 137/71 |

FOREIGN PATENT DOCUMENTS

| | | | | |
|---|---|---|---|---|
| EP | 0763689 A1 | * | 3/1997 | |
| GB | 000008724 A1 | * | 10/1913 | .............. 137/68.11 |

* cited by examiner

Primary Examiner—John Rivell
(74) Attorney, Agent, or Firm—Andrus, Sceales, Starke & Sawall, LLP

(57) ABSTRACT

A shear valve for use in a fuel delivery system includes a valve body wherein a first end is adapted to be connected to a fuel inlet, and a second oppositely-disposed end is adapted to be connected to a fuel outlet. The valve body is provided with a readily frangible or separable region between the first and second ends. The first end has an emergency shut-off valve biased towards a closed position, and is normally held open by a displaceable abutment having one ball or roller.

9 Claims, 3 Drawing Sheets

SHEAR VALVE

This invention relates to shear valves primarily intended for use with fuel delivery systems, including petrol and liquefied petroleum gas (LPG).

There is a concern that fuel delivery systems in fuel filling stations should be provided with connection to the liquid fuel line which, if damaged, e.g. by impact from a road vehicle, will break in such a way as to shut off the fuel connections so as to minimise leakage of fuel in such an incident onto the forecourt of the filling station.

In some fuel filling stations, fuel is dispensed from tanks in which the fuel delivery pump is submerged in the tank. As a consequence, accidental damage to the fuel delivery pedestal during dispensing of fuel can result in fuel being pumped onto the forecourt from a fractured delivery pipe.

This invention particularly relates to the provision of arrangements for overcoming the above problems.

According to one aspect of the present invention there is provided a shear valve for use in a fuel delivery system which comprises a valve body wherein a first end is adapted to be connected to a fuel inlet and a second oppositely disposed end is adapted to be connected to a fuel outlet, said first end including an emergency shut-off valve which is biased towards its closed position, and the valve body having a readily frangible or separable region between said ends and said emergency shut-off valve normally being held open by a displaceable abutment comprising at least one ball or roller.

Preferably, the second end houses a non-return valve which is arranged to prevent fuel from flowing out of the damaged or fractured valve body from the fuel delivery end.

In one embodiment, the displacement abutment comprises one or more rollers or balls, the arrangement being such that distortion or breakage of the valve body causes displacement of a roller and/or ball, with resulting closure of the shut-off valve.

In a preferred embodiment, the displaceable abutment comprises a ball or roller which is normally held in place by engagement with a pointed member, the arrangement being such that distortion or breakage of the valve body causes relative movement of the ball or roller or the pointed member, with resulting closure of the shut-off valve. A ball is preferred because it takes up less space and alignment with the pointed member and an operating portion of the shut-off valve is easier to achieve. The term "pointed member" is intended to include any tapered member. For example, it may be cone or wedge shaped and may have a blunt or sharp tip. In this context, 'cone' includes members having a circular, elliptical, rectangular or square section. The tip or edge of the 'pointed' member should provide a small area of support for the ball or roller so that any significant distortion of the two ends of the valve body will cause the ball or roller to be displaced.

The ball or roller may be housed in an insert member within the valve body. A guide for the ball or roller, e.g. a bore, may be formed in the insert member, which also includes at least one passageway to permit fuel to flow during normal operation through the valve body. The passageway is sized and/or shaped so that a ball which escapes in the event of breakage or distortion of the valve body cannot pass through and jam the shut-off valve. Conveniently, the insert member may be threaded for convenient location and fixing within the valve body.

The pointed member is also supported in or on a second insert member which may also be threaded for easy location within the valve body. In a similar way to the insert member which supports the ball or roller, the second insert member also includes at least one passageway to allow fuel to pass through the valve and which is shaped or sized to prevent a displaced ball or roller from passing through and jamming the non-return valve.

The displacement device may include release means which is sensitive to elevated temperature, whereby in the event of an adjacent fire, the ball or roller is released and the shut-off valve is caused to close.

The invention will be illustrated by the embodiments of the present invention which are shown in the accompanying drawings, in which.

Figure 1:
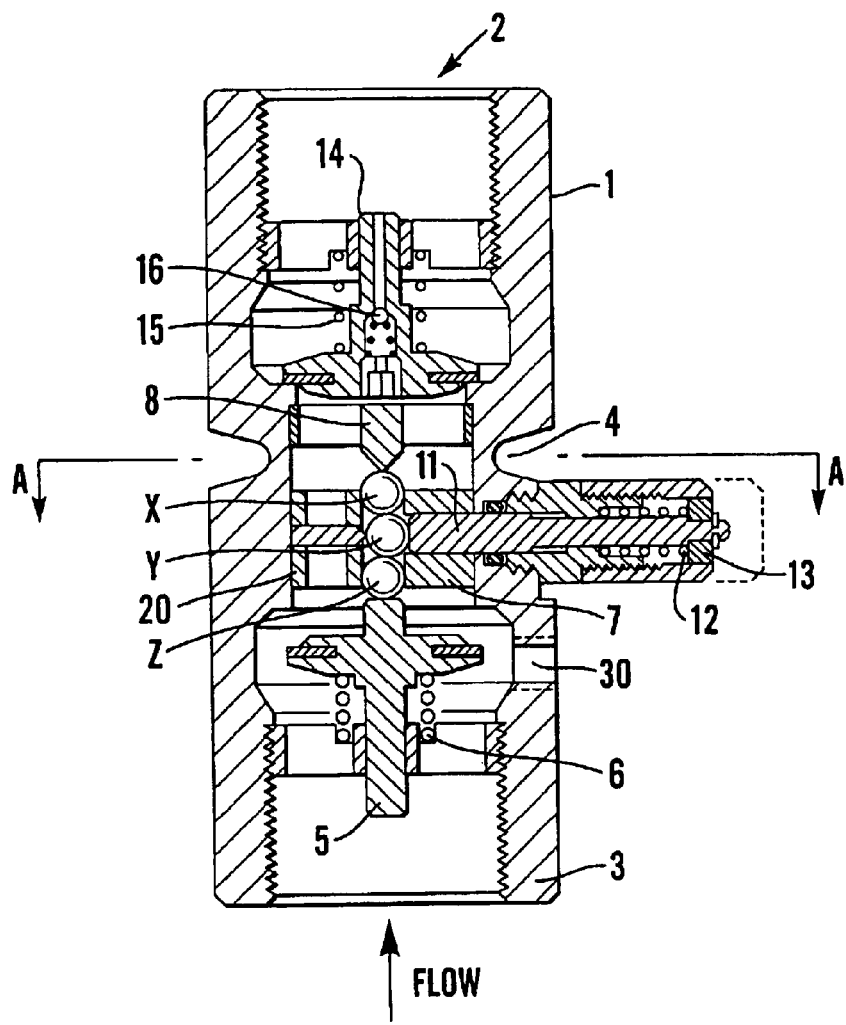
FIG. 1 is a longitudinal section through one shear valve in accordance with the invention.
Figure 2:
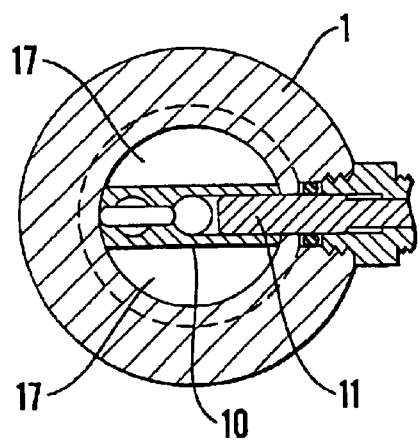
FIG. 2 is a transverse section taken along the line A—A in FIG. 1.

Referring to the drawings, the valve shown in FIGS. 1 and 2 comprises a valve body 1 having one end 2 adapted for connection to a fuel outlet, e.g. a fuel delivery hose leading to a fuel delivery nozzle, and a second opposite end 3 adapted for connection to a fuel inlet pipe, e.g. from a fuel tank. The valve body may be plumbed into a fuel dispensing line in which a delivery pump is submerged within a supply tank or is located upstream from the valve body. The valve body has a waisted region 4 which provides an easily frangible breakage point in the event that the valve body is subjected to a substantial mechanical force in shear or bending, e.g. where a petrol pump, for example, might be impacted by a manoeuvring vehicle. The valve body includes an emergency shut-off valve 5 which is biased by a high force spring 6 to close onto a valve seat 7.

The emergency shut-off valve is held in its normal open position as shown in FIG. 1, by an abutment comprising 3 aligned balls X, Y and Z and a pointed member comprising a cone 8 fixed relatively to the valve body. The balls X, Y and Z are normally constrained to extend in an aligned relationship by a guide 10. The guide 10 includes a pin 11 which maintains the central ball Y in position during normal ambient temperature. Pin 11 is held in the position shown in FIG. 2 by a spring 12 which shuts on a plug of solder 13. Solder plug 13 is selected so that it melts at a suitable temperature, judged to be a dangerous operating temperature, e.g. about 160 to 180° C. Alternatively, the central ball, Y, can be released by the manually operated needle valve mechanism for test purposes.

The upper part of the valve body includes a non-return delivery valve 14 which is normally held into its closed position by a light spring 15. The spring 15 is selected so that a low operating pressure of a level equivalent to that produced by a fuel pump, will lift the valve and allow the fuel to be delivered through the valve body. A thermal relief valve 16 may be provided to prevent back pressure in the fuel delivery hose rising to too high a level, e.g. in the event of a high ambient temperature.

The valve operates in the following manner. In normal conditions, when the fuel delivery pump (not shown) is activated, fuel flows in the direction indicated by the arrow into the lower end of the valve, passing the open emergency shut-off 5 and through passages 17 on each side of the abutment guide (10). Under the pressure generated by the fuel delivery pump, the non-return valve 14 will open and allow fuel to pass through the valve body.

In the event of a collision causing damage to the valve body, the body will be either distorted or fractured along the line A—A. In this event, ball X will escape from the abutment guide 10 as the ball X and the apex of the cone are moved out of alignment. When this occurs, there will no longer be any restraint preventing the shut-off valve 5 closing, and this will close onto the valve seat 7, thereby preventing any loss of fuel from the fuel line which is connected to the valve body. At the same time, this will reduce the pressure lifting the valve 14, so that this valve will also close onto its seat.

In the event of the temperature rising substantially in the area of the valve body, e.g. as a result of a fire in the vicinity, the solder plug 13 will melt, thereby permitting the central ball Y to move laterally to the right as seen in FIG. 1. This will then allow the emergency shut-off valve 5 to close onto its seat 7. It will be seen from FIG. 1 that the central ball Y is slightly displaced in its rest position towards the pin 11. On outward movement of the pin 11, pressure of the spring 6 will cause the ball Y to be forced out towards the pin 11, thus reducing the number of balls between the stem of the valve 5 and the point of the cone 8 and allowing the valve 5 to close onto its seat 7.

FIG. 2 shows a section through an insert member 20 which incorporates the guide for the balls. As can be seen, the passageways 17 on each side of the guide means provide ample space for passage of fuel.

Figure 3:
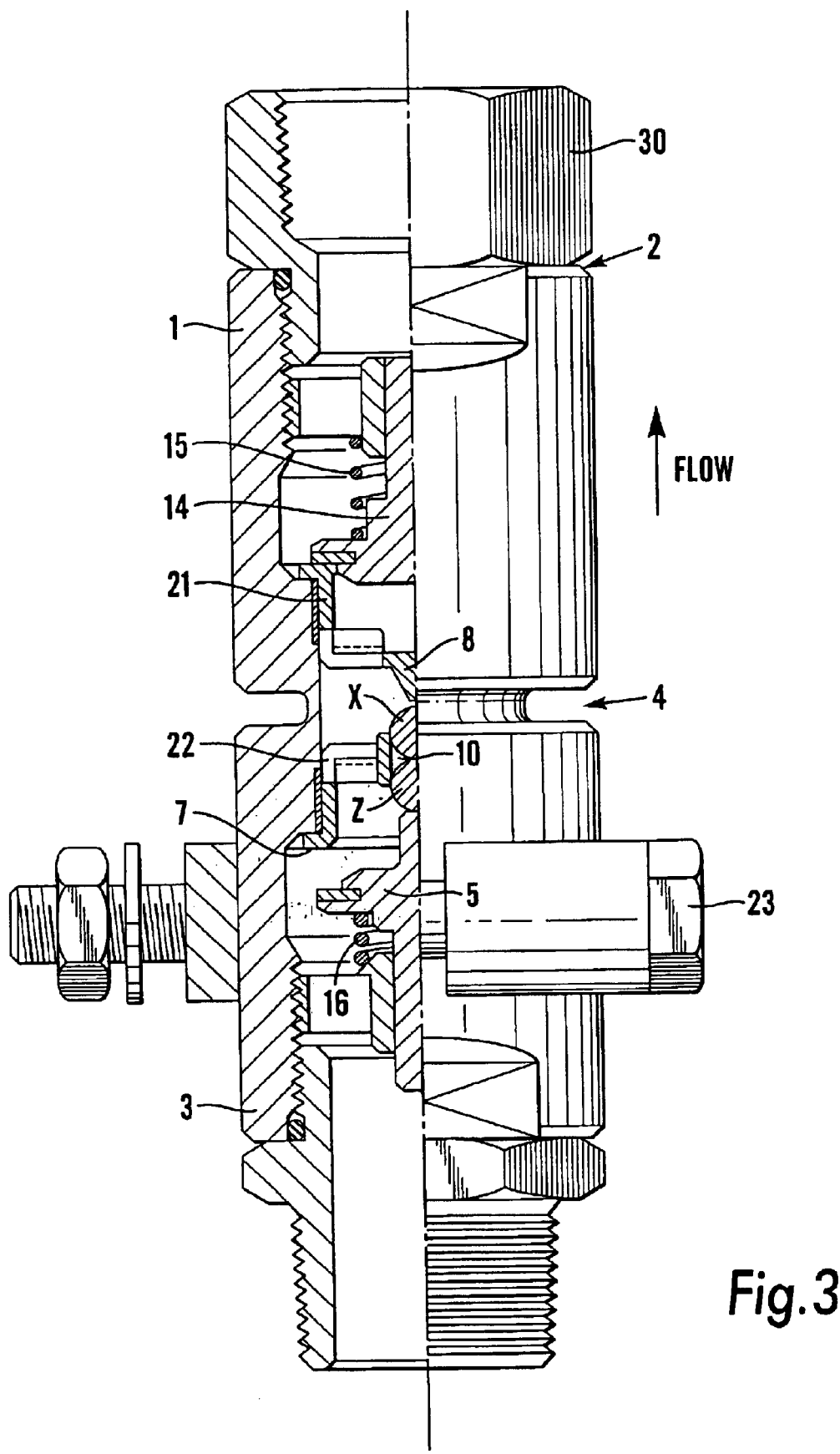
FIG. 3 is a partial longitudinal section through a second shear valve in accordance with the invention.

FIG. 3 shows an embodiment which does not include a thermally activated or manual override device for releasing a ball to trigger the closure of the shut-off valve. The construction of the shear valve of FIG. 3 is, in other respects, essentially similar to that shown in FIG. 1 and the same reference numerals have been used to indicate equivalent parts.

Referring to FIG. 3, the emergency shut-off valve 5 is normally held in its open position against the closing force of a heavy spring 16, by balls X and Z and cone-shaped abutment 8, which are aligned with the stem of valve 5. Two balls only are provided and these are held in guide bore 10 formed in insert 22. Insert 22 is shown in perspective view in FIG. 4B. The rim 24 is threaded for ease of fixing the insert within the valve body. As can be seen in FIG. 4B, the insert has passageways 25 to permit fuel to flow through the insert. These passageways are sized and shaped to prevent entry of an 'escaped' ball which might jam a valve.

Figure 4A:
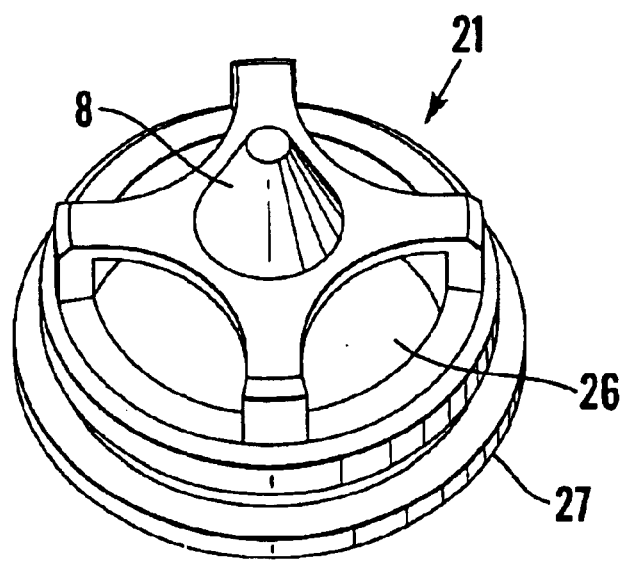
FIGS. 4A and 4B are, respectively, perspective views of an insert member for the pointed member and an insert member for retaining the ball or balls which together retain the shut-off valve in the normal open, operating position.
Figure 4B:
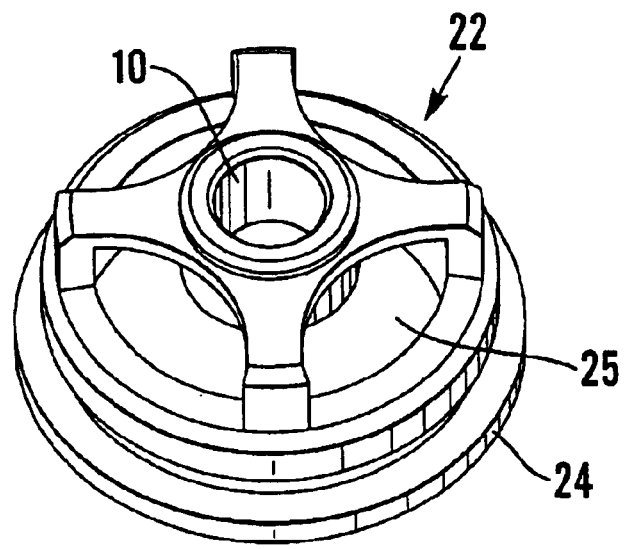

Similarly, the pointed cone 8 is mounted or formed in an insert 21 which is shown in perspective view in FIG. 4A. This may also have a rim 27 which is threaded for fixing into the interior of the valve body and be formed with passageways 26 for fuel to pass through. These passageways are also shaped or dimensioned to prevent entry of an escaped ball.

A clamp 23 may be provided for rigidly fixing the valve body halves into the base of a fuel dispensing pump and/or ground level framework.

In the event that the shear valve is damaged by impact, it operates in a similar way to the valve shown in FIG. 1. Thus, an impacting force will cause breakage or distortion of the valve body at the shear region 4. This will cause relative movement of the two ends of the valve body 2 and 3, thereby allowing the ball X to escape and move out of alignment with the point of the cone 8. As a result, the stem of valve 5 is no longer restrained from moving upwardly and closes onto its valve seat 7 under the influence of spring 16. The non-return valve 14 prevents fuel or vapour from escaping from the fuel delivery line which would be connected to union 30.

The body of the valve in the case of either embodiment would be manufactured from a relatively brittle grade of brass or aluminium (e.g. grade 6262 T 9 in the case of aluminium).

As indicated in FIG. 1, a test port 30 may be provided to test the operation of the shut-off valve when a ball is displaced.

The above described shear valve is particularly suited for use in dispensing a liquefied petroleum gas product, as well as in a petrol or other delivery system.

Although the shear valve shown in the accompanying drawings has a one piece valve body, it will be appreciated that it could alternatively be made in two or more parts, in a similar manner to the valve described in our co-pending patent application No. 9822707.7 (Ser. No. 2342709). It may be advantageous, for example, to manufacture upper and lower parts respectively housing the non-return valve and emergency shut-off valve. These parts may be identical housings. A third, intermediate part may include the thermal release mechanism and suitable seals provided between the parts. The parts may be installed with clamps on either half as shown in our above cited application, to provide a rigid mounting capable of transmitting an impact force.

What is claimed is:

1. A shear valve for use in a fuel delivery system which comprises a valve body wherein a first end is adapted to be connected to a fuel inlet and a second oppositely disposed end is adapted to be connected to a fuel outlet, said first end including an emergency shut-off valve which is biased towards its closed position and the valve body having a readily frangible or separable region between said ends and said emergency shut-off valve being normally held open by a displaceable abutment comprising a ball, normally held in place by engagement with a pointed member, the arrangement being such that distortion or breakage of the valve body causes relative displacement of the ball and the member with resulting closure of the shut-off valve.

2. A shear valve as claimed in claim 1 in which the ball is normally held in a guide to maintain the ball and the pointed member in alignment with an operating portion of the shut-off valve, the arrangement being such that on distortion or breakage of the valve body, the ball is released from the guide, thus permitting the shut-off valve to close.

3. A shear valve as claimed in claim 2 in which the guide comprises an insert within the tubular body, the insert having a bore for receiving the ball and at least one passageway to allow fuel to pass therethrough.

4. A shear valve as claimed in claim 3 in which the passageway is sized or shaped so as to inhibit passage of a ball therethrough.

5. A shear valve as claimed in claim 1 in which the pointed member is supported in a second insert within the tubular body for alignment with the ball and includes at least one passageway to allow fuel to pass through the insert.

6. A shear valve as claimed in claim 1 wherein the readily frangible region comprises a portion of the valve body having a reduced wall thickness.

7. A shear valve as claimed in claim 1 wherein the second end includes a non-return valve.

8. A shear valve as claimed in claim 7 wherein the non-return valve includes a thermal relief valve which permits vapour under pressure to be vented from pipework connected to the fuel outlet from the tubular valve body.

9. A shear valve as claimed in claim 1 wherein the displaceable abutment includes release means which is sensitive to elevated temperature, whereby increase in temperature in the region of the valve causes the ball to be released and the shut-off valve to close.

* * * * *